United States Patent
Livesley et al.

(10) Patent No.: US 12,112,197 B2
(45) Date of Patent: Oct. 8, 2024

(54) PROCESSOR WITH HARDWARE PIPELINE

(71) Applicant: Imagination Technologies Limited, Kings Langley (GB)

(72) Inventors: Michael John Livesley, Hertfordshire (GB); Ian King, Hertfordshire (GB); Alistair Goudie, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 14 days.

(21) Appl. No.: 17/953,821

(22) Filed: Sep. 27, 2022

(65) Prior Publication Data

US 2023/0120307 A1     Apr. 20, 2023

(30) Foreign Application Priority Data

Sep. 30, 2021   (GB) ..................................... 2113979

(51) Int. Cl.
*G06F 9/48*     (2006.01)
*G06F 9/46*     (2006.01)

(52) U.S. Cl.
CPC ............ *G06F 9/4881* (2013.01); *G06F 9/462* (2013.01)

(58) Field of Classification Search
None
See application file for complete search history.

(56) References Cited

U.S. PATENT DOCUMENTS

| | | | |
|---|---|---|---|
| 5,630,149 A | | 5/1997 | Bluhm |
| 5,713,038 A | * | 1/1998 | Motomura .......... G06F 9/30127 |
| | | | 712/228 |
| 5,742,822 A | * | 4/1998 | Motomura .............. G06F 9/462 |
| | | | 712/228 |

(Continued)

FOREIGN PATENT DOCUMENTS

| | | |
|---|---|---|
| CN | 1719375 A | 1/2006 |
| CN | 102436393 A | 5/2012 |

(Continued)

OTHER PUBLICATIONS

Eisemann et al; "Fast Ray / Axis-Aligned Bounding Box Overlap Tests using Ray Slopes"; Jan. 8, 2008; Computer Graphics Lab; 21pages.

(Continued)

*Primary Examiner* — Van H Nguyen
(74) *Attorney, Agent, or Firm* — Potomac Law Group, PLLC; Vincent M DeLuca (57) ABSTRACT

A processor has a register bank to which software writes descriptors specifying tasks to be processed by a hardware pipeline. The register bank includes a plurality of register sets, each for holding the descriptor of a task. The processor includes a first selector operable to connect the execution logic to a selected one of the register sets and thereby enable the software to write successive ones of said descriptors to different ones of said register sets. The processor also includes a second selector operable to connect the hardware pipeline to a selected one of the register sets. The processor (Continued)

further comprises control circuitry configured to control the hardware pipeline to begin processing a current task based on the descriptor in a current one of the register sets while the software is writing the descriptor of another task to another of the register sets.

20 Claims, 4 Drawing Sheets

(56) References Cited

U.S. PATENT DOCUMENTS

| | | | |
|---|---|---|---|
| 6,621,925 | B1 | 9/2003 | Ohmori et al. |
| 7,080,234 | B2 * | 7/2006 | Saulsbury ............ G06F 9/30101 712/E9.035 |
| 9,182,992 | B2 * | 11/2015 | Guerrero ............... G06F 9/3867 |
| 9,286,069 | B2 * | 3/2016 | Airaud ................. G06F 9/3858 |
| 10,445,295 | B1 | 10/2019 | Han et al. |
| 2002/0032849 | A1 * | 3/2002 | Saulsbury ............. G06F 9/3853 712/228 |
| 2006/0007234 | A1 | 1/2006 | Hutchins et al. |
| 2013/0046951 | A1 | 2/2013 | Jones |
| 2014/0118380 | A1 | 5/2014 | Hakura et al. |
| 2015/0109314 | A1 | 4/2015 | Redshaw |
| 2015/0363970 | A1 | 12/2015 | Spinella-Mamo et al. |
| 2017/0256020 | A1 | 9/2017 | Sansottera et al. |
| 2017/0329632 | A1 | 11/2017 | Ma et al. |
| 2018/0286010 | A1 | 10/2018 | Koker et al. |
| 2019/0205745 | A1 | 7/2019 | Sridharan et al. |
| 2019/0221024 | A1 | 7/2019 | Howson |
| 2019/0377503 | A1 | 12/2019 | Schluessler et al. |
| 2020/0004587 | A1 | 1/2020 | Griffin et al. |
| 2020/0104170 | A1 | 4/2020 | Else et al. |
| 2020/0193685 | A1 | 6/2020 | Saleh et al. |
| 2020/0380758 | A1 | 12/2020 | Novales et al. |
| 2021/0142438 | A1 | 5/2021 | Appu et al. |
| 2021/0149679 | A1 | 5/2021 | Burns et al. |

FOREIGN PATENT DOCUMENTS

| | | |
|---|---|---|
| CN | 110659115 A | 1/2020 |
| CN | 110998649 A | 4/2020 |
| CN | 111353928 A | 6/2020 |
| CN | 111527485 A | 8/2020 |
| CN | 111796574 A | 10/2020 |
| CN | 113342513 A | 9/2021 |
| CN | 113377524 A | 9/2021 |
| EP | 3185128 A1 | 6/2017 |
| EP | 3385850 A1 | 10/2018 |
| EP | 3751507 A1 | 12/2020 |
| EP | 3796263 A1 | 3/2021 |
| WO | 2007002592 A2 | 1/2007 |

OTHER PUBLICATIONS

Kay et al; "Ray Tracing Complex Scenes"; ACM SIGGRAPH Computer Graphics; vol. 20; No. 4; 1986; pp. 269-278.

Mahovsky et al; Fast Ray-Axis Aligned Bounding Box Overlap Tests with Plucker Coordinates; Journal of Graphics Tool; vol. 9; No. 1; pp. 35-46.

Majercik et al; "A Ray-Box Intersection Algorithm and Efficient Dynamic Voxel Rendering"; Journal of Computer Graphics Techniques; vol. 7; No. 3; 2018.

Wald; "Realtime Ray Tracing and Interactive Global Illumination"; PHD Thesis; 308 pages.

* cited by examiner

PROCESSOR WITH HARDWARE PIPELINE

BACKGROUND

Some processors can be designed with application-specific hardware that performs certain dedicated operations in fixed-function circuitry. An example of such a processor is a GPU (graphics processing unit), which may comprise one or more dedicated graphics processing pipelines implemented in hardware (note that for the purpose of the present disclosure, the term "processing" does not necessarily imply processing in software).

For instance, a tile-based GPU may comprise a dedicated geometry processing pipeline, and/or a dedicated fragment processing pipeline. As will be familiar to a person skilled in the art, geometry processing transforms a 3D model from 3D world space to 2D screen space, which is divided into tiles in a tile-based system. The 3D model is typically comprised of primitives such as points, lines, or triangles. Geometry processing comprises applying a viewpoint transform, and may also comprise vertex shading, and/or culling and clipping the primitives. It may involve writing a data structure (the "control stream") for each tile, which describes a subset of the primitives from which the GPU can render the tile. Thus the geometry processing involves determining which primitives fall in which tile. The fragment processing, also called the rendering stage, takes the list of primitives falling within a tile, converts each primitive to fragments (precursors of pixels) in 2D screen space, determines what colour the fragments should be and how the fragments contribute to pixels (the elements to be lit up on screen) within the tile. This may involve applying fragment shading which performs texturing, lighting, and/or applying effects such as fog, etc. Textures may be applied to the fragments using perspective correct texture mapping.

The software running on the execution logic of an application-specific processor, such as a GPU, requires a mechanism to be able to delegate tasks to one of its dedicated hardware pipelines for processing. To enable this the processor comprises a register bank to which the software can write a descriptor of a task. The descriptor describes the task (i.e. workload) to be performed. To do this, the descriptor may comprise data to be operated on by the task, or more usually pointers to the data in memory. And/or, the descriptor may comprise one or more parameters of the task, or pointers to such parameters in memory. The descriptor may be constructed by the software according to an instruction from elsewhere, e.g. a driver running on a host CPU, and may require that data relating to the task is read from memory. Alternatively the descriptor may have been constructed by a hardware pipeline running a previous task (e.g. which is how a fragment pipeline may work, running on data structures previously written by a geometry pipeline).

Once the descriptor is written, the software asserts a ready flag, also sometimes called a "kick flag", which triggers the hardware pipeline to start processing the task based on the descriptor found in the register bank. The processing of a task by the hardware pipeline may also be referred to as a "kick". Once it has completed the task, the hardware pipeline writes a result of the processing to a structure in memory. For example in the geometry phase, the geometry pipeline may write an internal parameter format (control stream and primitive blocks), and in the fragment phase the fragment pipeline writes the frame buffer (pixel colour and alpha data) and depth buffer (pixel depth values). The pipeline may also write a result such as a final status of the task back to the register bank. Once the results are written, the pipeline then asserts another flag in an interrupt register. This causes the software to read the results from the memory and/or registers. The software can then write a descriptor of a new task to the register bank, and so forth.

SUMMARY

However, an issue with this is that constructing a task descriptor and writing to the register bank takes time. There is therefore a period while the hardware pipeline is idle between tasks, waiting for the software to write the descriptor of the next task to the register bank before it can start processing the next task. It would be desirable to mitigate this effect.

According to one aspect disclosed herein, there is provided a processor comprising: execution logic comprising one or more execution units for running software; a hardware pipeline comprising fixed-function hardware; and a register bank to which the software can write descriptors specifying tasks to be processed by the hardware pipeline. The register bank comprises a plurality of register sets, each for holding the descriptor of one of the tasks at any one time. The circuit comprises a first selector operable to connect the execution logic to a selected one of the register sets at any one time, and thereby enable the software to write successive ones of said descriptors to different ones of said register set. The circuit also comprises a second selector operable to connect the hardware pipeline to a selected one of the register sets at any one time. The circuit further comprises control circuitry configured to control the hardware pipeline to begin processing a current one of said tasks based on the descriptor in a current one of the register sets while the software is writing the descriptor of another of said tasks to another of the register sets, the current register set being that currently connected to the hardware pipeline by the second selector.

In an example implementation, each of the register sets may be arranged to further hold a respective ready flag, and the processor may further comprise a respective completion register arranged to hold a respective completion flag associated with each of the register sets. The hardware pipeline may be configured to assert the respective completion flag once it has completed processing the task specified by the descriptor in the current register set. The control circuitry may be configured to connect the hardware pipeline to a next one of the register sets, holding the descriptor of a next one of the tasks to be processed, once: a) the completion flag associated with the current register set has been asserted, and b) the respective ready flag of the next register set has been asserted by the software to indicate that the write of the next task's descriptor has been done. The next register set may be said other register set and the next task may be said other task.

It also takes time for the software to respond when a task completes—such as servicing the interrupt, fetching interrupt handling code from memory, executing it, reading registers to obtain status information, etc. It would be desirable to mitigate this idle time that can exist after processing a task, as well as before.

Preferably therefore, in embodiments the hardware pipeline may be configured to write one or more results of the processing of the current task to memory and/or the current register set; and the control circuitry may be configured to control the hardware pipeline to begin processing the next task based on the descriptor in the next register set while the software is reading out and/or post-processing one, some or all of the results of the current task.

In embodiments, the control circuitry or hardware pipeline may be configured to de-assert the respective ready flag once the processing of the task specified by the descriptor in the current register set has begun; and the respective completion flag, when asserted, signals to the software to read out corresponding results that have been written back to the register set by the hardware pipeline, and to overwrite with a descriptor of a further task.

In embodiments the register sets may consist of a first and a second register set, and the control logic may be operable to alternate back and forth between using the first and second register sets for the current and the next task. Alternatively there could be more than two register sets. In this case the software may setup and kick n tasks, as long as sufficient number of register sets exist to utilise.

The processor may be embodied in hardware on an integrated circuit. There may be provided a method of manufacturing, at an integrated circuit manufacturing system, a processor. There may be provided an integrated circuit definition dataset that, when processed in an integrated circuit manufacturing system, configures the system to manufacture a processor. There may be provided a non-transitory computer readable storage medium having stored thereon a computer readable description of a processor that, when processed in an integrated circuit manufacturing system, causes the integrated circuit manufacturing system to manufacture an integrated circuit embodying a processor.

There may be provided an integrated circuit manufacturing system comprising: a non-transitory computer readable storage medium having stored thereon a computer readable description of the processor; a layout processing system configured to process the computer readable description so as to generate a circuit layout description of an integrated circuit embodying the processor; and an integrated circuit generation system configured to manufacture the processor according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

BRIEF DESCRIPTION OF THE DRAWINGS

Examples will now be described in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

Conventionally, idle time is introduced into a processor such as a GPU when software running on execution logic of the processor is configuring the processor's hardware for a new workload, or post-processing an existing workload (such as by examining dependencies to determine what should be submitted next, for example).

The present disclosure provides for the addition of multiple buffered configuration registers, intelligently partitioned and managed by control circuitry (the "kick tracker") along with mux/demux circuitry, in order to allow the above-mentioned idle time to be reduced or even eradicated. The software (e.g. firmware) can set up and issue a kick on the hardware which will be held internally pending until it can be processed by the hardware. Completion of the workload may be immediately followed by the next pending workload, with the software able to post-process offline preserved state from the first workload while the hardware continues processing the next workload.

Figure 1:
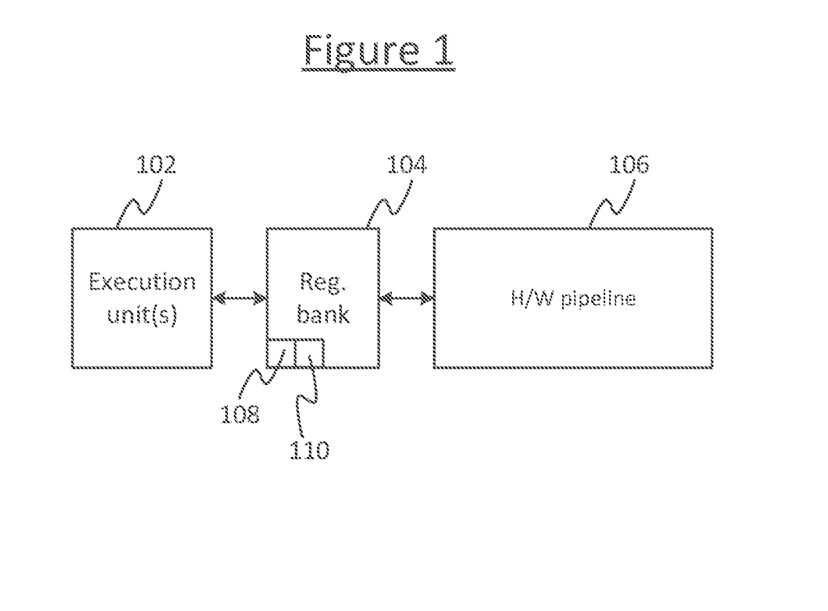
FIG. 1 is a schematic block diagram of a processor comprising a hardware pipeline.

FIG. 1 illustrates a conventional application-specific processor such as a GPU. The processor comprises execution logic 102, a register bank 104 and a hardware pipeline 106. The execution logic 102 comprises one or more execution units for executing software in the form of machine code instructions stored on a memory of the processor (not shown). The software may be referred to as firmware. The execution logic 102 is operatively coupled to the register bank 104 in order to allow the software running on the execution logic 102 to write values to the register bank 104 and read values from the register bank 104. The hardware pipeline 106 is also operably coupled to the register bank 104, so as to be able to write values to the register bank 104 and read values from the register bank 104. The register bank 104 includes a "kick pulse" register 108 for holding a flag referred to as the "kick pulse", and an interrupt register 110 for holding an interrupt flag.

In a GPU, the hardware pipeline 106 may be a geometry processing pipeline or a fragment processing pipeline. Other examples found in GPUs include 2D processing pipelines, ray tracing, and compute pipelines. A GPU would typically have multiple such hardware pipelines, each with a respective register bank 104. For convenience FIG. 1 shows just one such pipeline 106 and its respective register bank 104.

By means of the register bank 104, the software running on the execution unit(s) 102 of the processor can issue a task (comprising a workload) to a hardware pipeline 106. This is done by the firmware writing a descriptor of the task to the register bank 104. The descriptor may comprise values pertaining to configuration of the hardware pipeline 106, and/or may provide addresses in external memory for the pipeline 106 to fetch the workload. E.g. in the case of a GPU, the values written to the register bank 104 may comprise things such as the screen resolution in pixels, what antialiasing factor is enabled, and what format to write the frame buffer output in, etc., as well as pointers to data to be processed.

In embodiments, a given task, as described by a given descriptor, may comprise the processing of a given render, or a given sub-render of a given render. Different tasks described by different descriptors may comprise the processing of different renders or performing different sub-renders of the same render. For example within a frame there may be many geometry kicks and many fragment kicks as the processing of a given frame may involve separate passes, or renders, that do things like generate depth data used in an additional kick or do render to texture which is then referenced in another kick. Any given render may process a render area that differs to the frame area. For example the render may only relate to a section of the frame, or may not even necessarily directly correspond to a section of the frame (e.g. it may relate to a small area to be used as a texture in another render pass, or a shadow map that may be much larger in area than the eventually output frame). A render may itself be composed of multiple sub-renders or passes. In embodiments there may be a one-to-one or many-to-one relationship between geometry kicks and fragment kicks, and a many-to-one relationship between fragment kicks and a frame. So for example ten geometry kicks may generate the data for one fragment kick, and that may be done twice for a frame. Or another example could be to run forty-five geometry kicks each with a single fragment kick after to form the frame.

Once the software has written a descriptor to the register bank 104, it then writes a "kick pulse" to the kick pulse register 108. This acts as a flag to the hardware pipeline 106 that the descriptor is ready to be serviced, and triggers the hardware pipeline 106 to start processing the workload defined by the descriptor. When thus "kicked", the pipeline 106 reads the descriptor from the register bank 104 and performs the task specified by the descriptor. The hardware pipeline reads the workload and processes it according to the configuration registers, and then indicates completion to the firmware via an interrupt, by writing an interrupt flag to the interrupt register 110.

One or more results of the processing may be written back to memory, or to the register bank 104, or a combination. An example of a result written back to the register bank would be a status of the task at the end of the processing. In the case where a result is written back to the register banks 104, the interrupt causes the software running on the execution logic 102 to read the result back from the registers 104. Examples of a status that may be written back to the register bank 104 include: whether or not the task was successful, or whether it was completed in full or was context switched in the middle of processing and so ended early. In the latter case, this is an asynchronous interface between software and hardware, and so when the software issues a context switch request (to do something else higher priority and so stop mid progress work), the hardware may or may not act on it depending on when it arrives (it could arrive after the hardware is already naturally completing the kick). This is one such status register, which tells the software whether the in-flight context switch request had an effect (which means the kick was not complete, and may need to be resumed later if this work is required). Other examples of status that may be written back to the register bank 104 include things like checksums which can be used to compare against a reference to determine if the processing was correct.

From a software perspective, the software might be receiving work from a number of queues, each of which is associated with a workload type, e.g. a queue for 3D geometry processing, one for fragment processing, one for 2D graphics operations, etc. The firmware monitors these queues for work, and when scheduling one on the GPU writes the configuration registers and issues the 'kick' on the hardware through a final register write which starts the GPU working on it.

The period when the software is writing a descriptor to the register bank 104 may be referred to as the setup. The period when the hardware pipeline 106 is processing the task specified by the descriptor, and writing its result(s) to memory and/or registers 104, may simply be referred to as the processing period, or the "kick". Post-processing refers to the period when the results are there to be read, and the software is acting to service the result of the task and read any hardware registers 104 required in doing so. These are shown illustrated on a timeline in FIG. 2, where the setup is labelled 202, the hardware processing is labelled 204 and the post-processing is labelled 206. Once the hardware pipeline 106 has finished writing the result(s) and the software has finished post-processing the result(s), the software can then start writing a descriptor of the next task to the register bank 104. It then issues a new kick pulse to the kick register 108, triggering the hardware pipeline 106 to begin processing the next task based on the new descriptor, and so forth.

Figure 2:
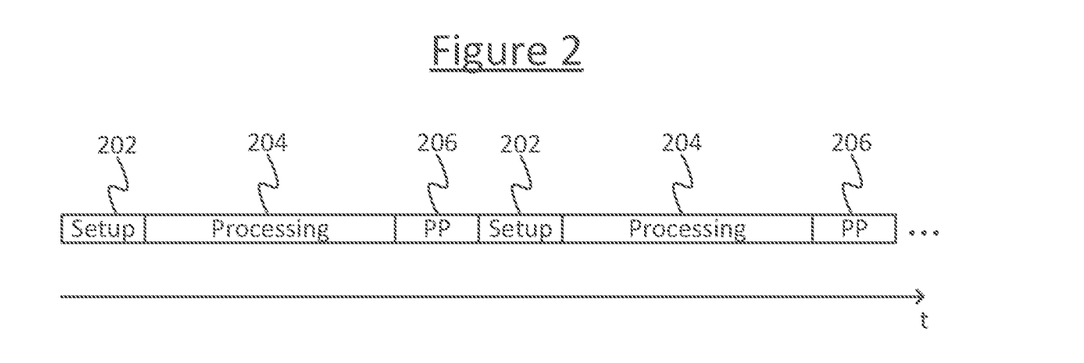
FIG. 2 is a timeline schematically illustrating the processing of a series of tasks by a hardware pipeline.

An issue with the conventional approach is that it creates bubbles in the pipeline 106. During the set-up and post-processing phases, the pipeline 106 has nothing to do. I.e. at the beginning of a cycle it is idle while waiting for the firmware 102 to set up the next descriptor in the registers 104. Also, at the end of the cycle the hardware pipeline 106 may be idle again while waiting for the software 102 to read out and-post-process the results from the registers 104 (and then set up the next task). The software needs to wait for the hardware pipeline 106 to finish writing its results before the software can start setting up a new descriptor, because those registers are still in use by the hardware—they are connected to modules in the hardware pipeline which would produce volatile behaviour if the contents was modified in the middle of a kick. In principle if the registers to which descriptors are written are separate to those which take the results, the software could start setting up a new descriptor before or during post-processing 206. However, the software is working on a queue of work, and with only a single set of result registers, it is most efficient (e.g. in terms of memory access patterns) to deal with one element of the queue (the post-processing) before moving onto the next.

Figure 4:
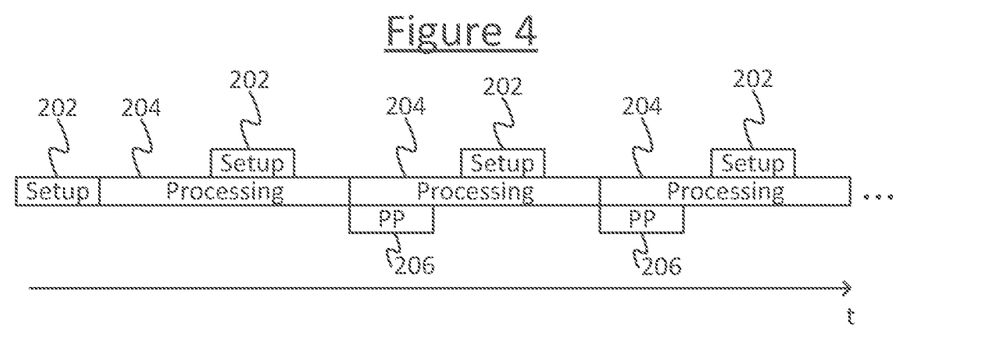
FIG. 4 is a timeline schematically illustrating the processing of a task by a hardware pipeline including overlapping of set-up and processing in accordance with embodiments disclosed herein.

It would be desirable to be able to temporally overlap the set-up of the next task with the processing of the current task. Preferably, it would also be desirable to be able to efficiently overlap the post-processing of the current task with the setup of the next task. An example of this aim is illustrated in FIG. 4.

Figure 3:
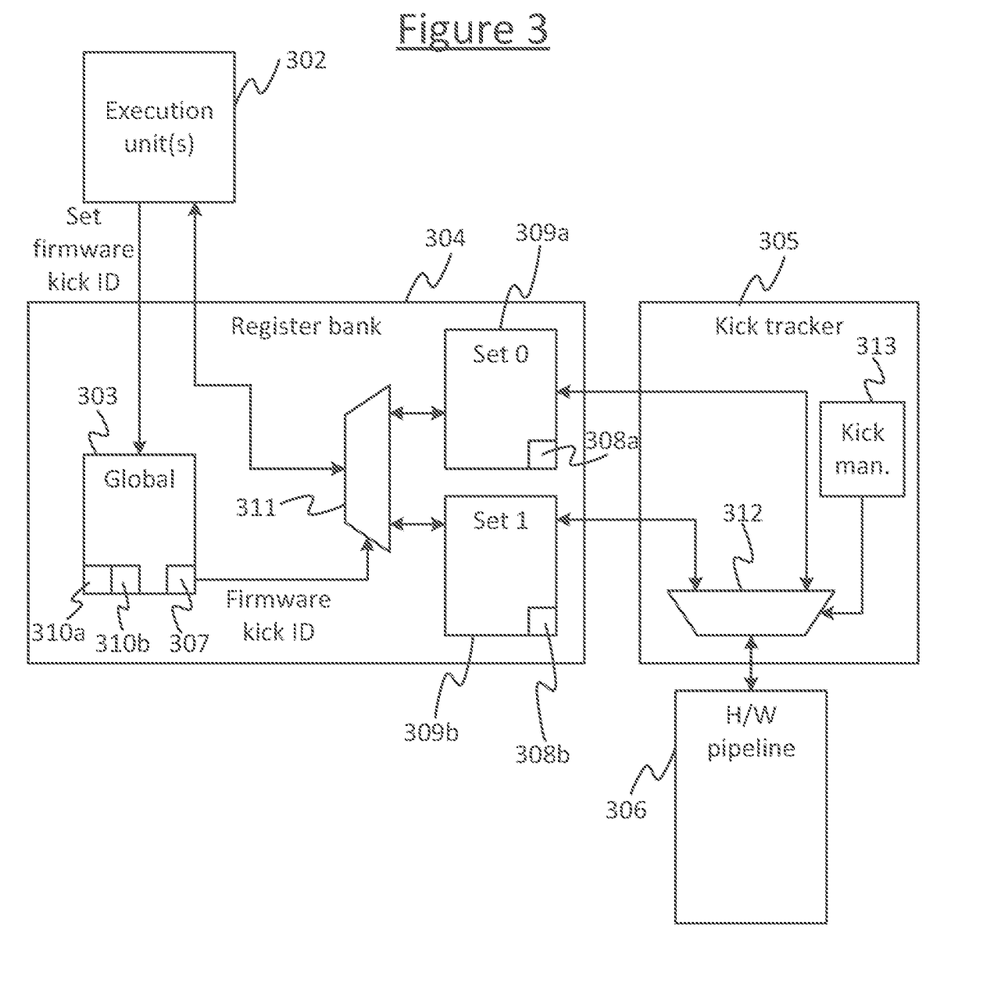
FIG. 3 is a schematic block diagram of a processor comprising control logic for controlling the processing of tasks by a hardware pipeline in accordance with embodiments disclosed herein.

Referring to FIG. 3, the presently disclosed processor enables this by having two sets of registers 309a, 309b in its register bank 304, each for setting-up a respective task.

The processor of FIG. 3 comprises execution logic 302, a register bank 304, a hardware pipeline 306, and control circuitry 305 which may be referred to herein as the "kick tracker". It will be appreciated that this is just a convenient label and any reference herein to the kick tracker could equally be replaced with the term "control circuitry".

The processor takes the form of an application-specific processor in that it has at least one hardware pipeline 306 for performing a certain type of processing, comprising special-purpose circuitry including at least some fixed-function hardware. This could consist purely of fixed-function hardware, or a mix of fixed-function hardware and programmable multi-function logic. The fixed function circuitry could still be configurable (such as to operate in different modes or with different parameters), but it is not programmable in the sense that it does not run sequences of instructions. Also, note that fixed-function or special-purpose does not necessarily mean the processor can only be used for the intended application, but rather that the hardware pipeline 306 comprises dedicated circuitry, configured to perform certain types of operation that are common in the intended application. For example the processor may take the form of a GPU and the hardware pipeline 306 may be a geometry pipeline, fragment pipeline, 2D processing pipeline, rendering pipeline or compute pipeline. The processor may in fact comprise multiple hardware pipelines of different types such as these. In this case the disclosed techniques may be applied independently to each hardware pipeline (a separate instance of the register bank 304 and kick tracker 305 being used for each), but for simplicity the following is described in relation to just one hardware pipeline 306. Note also that the applicability of the disclosed idea is not limited to a GPU. Other examples of processors which may include dedicated hardware pipelines include digital signal processors (DSPs), cryptoprocessors and AI accelerator processors.

The execution logic 302 comprises one or more execution units for executing software in the form of machine code instructions stored in a memory of the processor (not shown in FIG. 1). In certain implementations the software may be referred to as firmware in that it is low-level software for handling core functions of the application-specific processor, rather than user- or application-level software. However this is not essential and in general the software could be any kind of software.

The register bank 304 comprises a first register set 309a and a second register set 309b. The processor further comprises a first selector 311 associated with the register bank 304. The control circuitry (or "kick tracker") 305 comprises a management circuit (the "kick manager") 313 and a second selector 312. The kick tracker 313 is implemented in dedicated (fixed-function) hardware circuitry (as are the selectors 311, 312).

The execution logic 302 is operatively coupled to the register bank 304 via the first selector 311 in order to allow the software running on the execution logic 302 to write values to the register bank 304 and read values from the register bank 304. The hardware pipeline 306 is operably coupled to the register bank 304 via the second selector, so as to be able to write values to the register bank 304 and read values from the register bank 304. The first selector 311 is arranged to couple the execution logic 302 to either of the first register set 309a or the second register set 309b (but not both) at any one time. Thus the software running on the execution logic 302 can write to and read from either the first register set 309a or the second register set 309b, depending on which it is currently connected to. The second selector 312 is arranged to connect the hardware pipeline 306 to either the first register set 309a or the second register set 309b (but not both) at any one time. Thus the hardware pipeline 306 can read from and write back to either the first register set 309a or the second register set 309b, depending on which it is currently connected to. Each of the first and second selectors 311, 312 may also be described as a multiplexer-demultiplexer; in that the first selector 311 demultiplexes in the direction from execution logic 302 to register sets 309a, 309b and multiplexes in the direction from register sets 309a, 309b to execution logic 302; and the second selector 312 multiplexes in the direction from register sets 309a, 309b to hardware pipeline 306 and demultiplexes in the direction from hardware pipeline 306 to register sets 309a, 309b.

The software running on the execution logic 302 can thus write a descriptor of a task to either the first or second registers sets 309a, 309b at any one time; and the hardware pipeline 306 can read a descriptor of a task from either the first or second register set 309a, 309b at any one time. Similarly, in embodiments, the hardware pipeline 306 can write a result of a task back to either the first or second register set 309a, 309b at any one time; and the software can read a result of a task from either the first or second register set 309a, 309b at any one time. Alternatively or additionally, the hardware pipeline 306 may write some or all of its result(s) to a shared memory (not shown), from where the software may read back these result(s).

In embodiments the first and second tasks may comprise processing of different renders, or performing different sub-renders of the same render.

By controlling the second selector 312 to connect the hardware pipeline 306 to a different one of the first and second register sets 309a, 309b than the execution logic 302 is currently connected to via the first selector, the kick manager (i.e. management circuitry) 313 can thus control the hardware pipeline 306 to begin processing a current one of said tasks based on the descriptor in a current one of the first and second register sets 309a, 309b while the software is writing the descriptor of a next one of said tasks to the other of said first and second register sets 309b, 309a. Thus the set-up phase 202 of the next cycle can be overlapped partially or wholly with the processing stage 204 of the current cycle, as shown in FIG. 4.

Optionally, the post-processing 206 of the current cycle can also be overlapped with the processing stage 204 of the next cycle, as also shown in FIG. 4. However, this overlapping is not essential, for example if the post-processing is relatively brief compared to set-up.

An example implementation is as follows.

Each of the first and second register sets 309a, 309b includes its own respective ready register 308a, 308b for holding a respective ready flag. Each of these is somewhat akin to the kick pulse register 108 described in relation to FIG. 1, but with a separate instance for each the first and second register sets 308a, 308b. Also, when the software asserts the ready flag, this does not necessarily immediately issue a kick to the hardware pipeline 306. Instead this is arbitrated by the kick tracker 305, as will be discussed in more detail shortly. The ready registers 308a, 308b may each be referred to as a respective kick register of the respective register set 309a, 309b; and each ready flag may be described as a respective kick flag. However, again it will be appreciated that these is just convenient labels and could equally be replaced anywhere herein with the "ready" terminology.

In some embodiments there may also be a set of global registers 303 common to both tasks. Global registers are used for quantities that do not vary from kick to kick or frame to frame (in the case of a GPU), e.g. the power/clock gating setup of the pipeline 306, or whether parts of the pipeline 306 are powered down or up, or what parts of the pipeline 306 are statically configured to work together or not. Another example would be resets, etc.

The register bank 304 also comprises a kick ID register 307, and two completion registers 310a, 310b corresponding to the two individual register sets 309a, 309b respectively. Apart from these fields the register space of the bank 304 looks exactly the same to the software as it would in the prior system (so minimal modification to the software is needed).

The kick ID in the kick ID register 307 is writeable by the software, and controls the first selector 311 to connect either the first set of registers 309a or second set 309b to the execution logic 302. Thus the software can control which register set 309a, 309b it is currently connected to. Whichever one is currently connected, that is the register set to which the software can currently set-up a task by writing a task descriptor to that set. Once it has written a full task descriptor to a given one of the register sets 309a, 309b, the software then asserts the respective kick flag in the respective kick register 308a or 308b. Depending on implementation, the software may assert the kick flag by writing directly to the respective kick flag register 308a/b, or by sending a signal to the kick tracker 305 which causes the kick manager 313 to assert the kick flag. In other implementations a write to a kick register 308a/b may assert a kick flag that is maintained in other hardware, e.g. as a state change or in an internal register of the kick tracker 305.

As well as this, the system now comprises the kick tracker circuit 305 on the hardware side, which comprises another selector 312 which can connect a selected one of the two sets of registers 309a, 309b to the pipeline 306. The kick manager 313 of the kick tracker module 305 monitors the two kick registers 308a, 308b to determine when their respective kick flags are asserted, indicating that their respective sets of registers 309a, 309b are ready for processing, and controls the multiplexer 312 to select which one to connect to the pipeline 306 at any given time in order to keep the pipeline busy. In other words, the kick manager 313 accepts the kick inputs from kick registers 308a, 309b of the register bank 304, and keeps track of the order in which the software issued kicks to be processed. It marks them as pending until they are submitted for processing on the hardware, when they are marked active. The kick manager 313 is in control of the hardware kick selection (muxing registers 309a, 309b to HW) and also has a kick output which is connected to the hardware pipeline 306 which issues the actual kick pulse when it is determined to process it within the hardware 306.

The kick flag acts as a "kick" to the kick tracker 305 in the hardware, saying this kick is pending, and the hardware maintains it in a register saying it's pending, at least until such a time as the kick starts (goes active). In embodiments the kick flag is de-asserted as soon as the kick starts (i.e. the start of the hardware processing period 204). Alternatively however it could instead be de-asserted later, either during the kick or at the end of the kick (i.e. hardware processing period 204), as long as it is done before the software needs to set up a new task descriptor in the same set of registers 309a or 309b. Depending on implementation, the kick flag may be de-asserted automatically by the kick manager 313 or hardware pipeline 106, or by the software. Also, in embodiments, the software may have the option de-assert the flag early in order to cancel a task before it starts, or to cancel the task by writing to another register.

The hardware pipeline 306 may write one or more results of the processing of the task to a memory (not shown in FIG. 3 but e.g. see FIG. 5), or the respective register set 309 or 309b, or a combination of memory and the registers.

When the hardware pipeline 306 has finished processing a current task based on the descriptor from the register set 309a or 309b to which it is currently connected, the hardware pipeline 306 will assert the respective completion flag 310a or 310b. This signals to the software that it can now start reading the result(s) of the respective task (which may be from memory, or the respective register set 309 or 309b, or a combination of memory and the registers).

The completion flag may be de-asserted by the software, at the earliest once it has begun the respective post processing 206. It could be de-asserted later, such as once the software has completed the respective post-processing phase 206, as long as it is de-asserted before the hardware pipeline 106 starts the processing 204 of the next task from the same set of registers 209a or 309b.

In embodiments the completion registers 310a, 310b may each be an interrupt register, in which case each completion flag is a respective interrupt flag which raises an interrupt when asserted. An 'interrupt' is a signal which when set causes the firmware to stop doing what it is currently doing and read a status register to determine what interrupted it and why, and then service that. However, the use of interrupts is not essential and in alternative implementations the software may simply observe the completion flags and decide for itself when to service the results of the corresponding tasks.

The kick manager 313 is also arranged to monitor the completion flags 310a, 310b (either directly or via another signal giving the same information). It will select to connect the hardware pipeline 306 to the next register set, and issue a kick pulse, once both: a) the completion flag of the current task is asserted, and b) the kick flag of the next task is asserted. The kick pulse then triggers the hardware pipeline 306 to service the task descriptor in the next register set, to which it is now connected.

At least at times, the register set 309a or 309b connected to the execution logic 302 for set-up can be different than the set connected to the pipeline 306 for processing. This allows the software run on the execution logic 302 to be setting up a new task in the second set of registers 309b while the hardware pipeline 306 is still processing the task from the first set of registers 309a. In embodiments, the software also finishes the cycle by reading out the result(s) of the first task from the first set of registers 309a while the pipeline 306 gets on with processing the data now set up in the second set 309b. This can repeat in an alternating cycle, switching the roles mutatis mutandis between the first and second register sets 309a, 309b. I.e. after each cycle, what was the next register set (and task therein) now becomes the new current one, and what was the current register set (and task) now becomes the new next.

The software 302 keeps track of the next firmware kick ID to process (i.e. the order of kicks submitted to hardware, e.g. so if it has multiple completion interrupts for the same workload it knows which to service first). In response to the completion flags in the interrupt registers 310a, 310b, the software reads back the results of the respective tasks. Apart from this the register bank 304 looks exactly the same as the bank 104 in the conventional system of FIG. 1.

In contrast to that conventional system, the flag in the kick pulse register 308 no longer directly triggers the pipeline 306 to process a task. Instead, it acts as a signal from the software to the kick tracker 305 that the data in the respective set of registers 309 is ready for processing, and it is the kick tracker 305 that selects the exact time to trigger the pipeline 306 once the data is ready to be processed.

Figure 7:
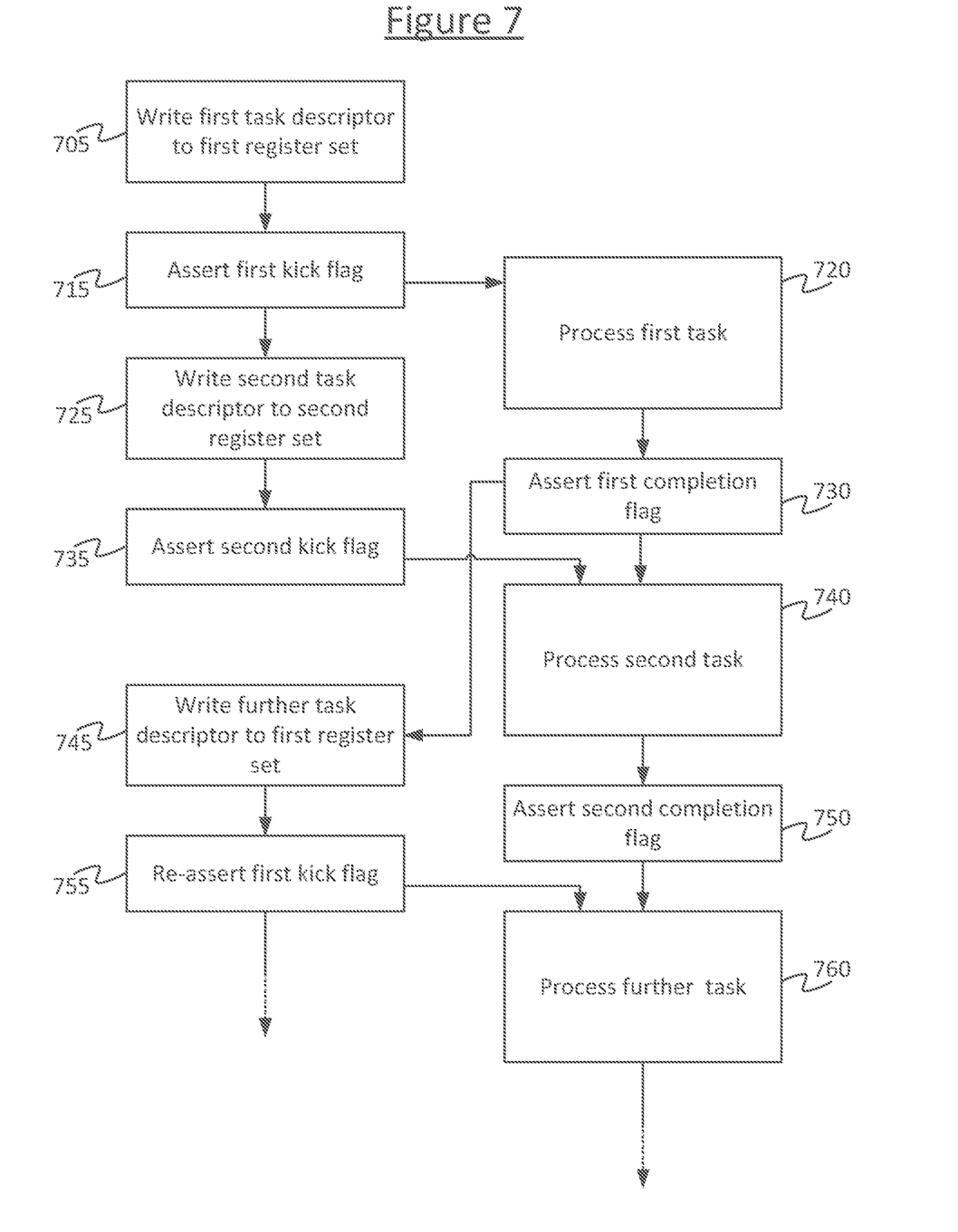
FIG. 7 is a flow chart of a method of controlling the processing of tasks by a hardware pipeline in accordance with embodiments disclosed herein.

FIG. 7 is a flow chart illustrating a method in accordance with embodiments disclosed herein. Steps in the left-hand column are performed by the software running on the execution logic 302, and steps in the right-hand column are performed by the hardware pipeline 306.

At step 705, the software selects to connect itself to the first register set 309a by writing the ID (e.g. 0) of the first register set 309a to the kick ID register 307. This controls the first selector 311 to connect the execution logic 302 to the first set of registers 309a. The software then writes a first task descriptor to the first register set 309a. Following this at step 715, the software asserts the first kick flag in the first kick register 308a. The kick manager 313 detects this, and in response (although perhaps not immediately, if the hardware pipeline 306 is processing a previous kick, as discussed further below with respect to steps 750, 755 and 760) controls the second selector 312 to connect the hardware pipeline 306 to the first register set 309a, and issues a kick pulse to the hardware pipeline 306. This causes, at step 720, the hardware pipeline 306 to start processing the first task as defined by the descriptor found in the first register set 309a. The kick manager 313 or hardware pipeline 306 may automatically de-assert the first kick flag once the processing of the first task has begun.

At step 725, while the hardware pipeline 306 is still processing the first task, the software selects to connect itself to the second register set 309b by writing the ID (e.g. 1) of the second register set 309b to the kick ID register 307. This controls the first selector 311 to connect the execution logic 302 to the second set of registers 309b. The software then writes a second task descriptor to the second register set 309b. This may be done partially or wholly while the hardware pipeline 306 is still processing the first task. Then at step 735, the software asserts the second kick flag in the second kick register 308b.

At step 730, the hardware pipeline 306 completes the processing of the first task, and signals this by asserting the first completion flag in the first completion flag register 310a. Note that step 730 may occur after step 735.

The kick manager 313 detects the assertion of the first completion flag, as well as the assertion of the second kick flag by the software. In response, on condition of both, the kick manager 313 controls the second selector 312 to connect the hardware pipeline 306 to the second register set 309b, and issues another a kick pulse to the hardware pipeline 306. This causes, at step 740, the hardware pipeline 306 to start processing the second task as defined by the descriptor found in the second register set 309b. The kick manager 313 or hardware pipeline 306 may automatically de-assert the second kick flag once the processing of the second task has begun.

The assertion of the first completion flag also signals to the software that it can start reading the result(s) of the first task (after which it may proceed to step 745 to write a new descriptor, as discussed shortly), and perform any post-processing required. In embodiments, the software may read and/or post-process some or all of the result(s) of the first task after the hardware pipeline 306 has started processing the second task. The software may de-assert the first completion flag once it has begun the post-processing of the result(s) of the first task.

At step 745, while the hardware pipeline 306 is still processing the second task, the software selects to connect itself back to the first register set 309a by writing the ID (e.g. 0) of the first register set 309a to the kick ID register 307. This controls the first selector 311 to connect the execution logic 302 back to the first set of registers 309a. The software then writes a further task descriptor to the first register set 309a. This may be done partially or wholly while the hardware pipeline 306 is still processing the second task. Then at step 755, the software re-asserts the first kick flag in the first kick register 308b.

At step 750, the hardware pipeline 306 completes the processing of the second task, and signals this by asserting the second completion flag in the second completion flag register 310b. Note that step 750 may occur after step 755. The kick manager 313 detects the assertion of the second completion flag, as well as the assertion of the first kick flag by the software. In response, on condition of both, the kick manager 313 controls the second selector 312 to connect the hardware pipeline 306 back to the first register set 309a, and issues another a kick pulse to the hardware pipeline 306. This causes, at step 760, the hardware pipeline 306 to start processing the further task as defined by the new descriptor now found in the first register set 309a. The kick manager 313 or hardware pipeline 306 may automatically de-assert the first kick flag again once the processing of the further task has begun.

The assertion of the second completion flag also signals to the software that it can start reading the result(s) of the second task, and perform any post-processing on the result(s) of the second task. In embodiments, the software may read and/or post-process some or all of the result(s) of the second task after the hardware pipeline 306 has started processing the further task. The software may de-assert the second completion flag once it has begun the post-processing of the result(s) of the second task.

The method may continue in this manner over a plurality of cycles, alternating between the hardware 306 processing the task specified in the first register set 309a in one cycle while the software is writing the next descriptor to the second register set 309b, and then in the next cycle the hardware 306 processing the task specified in the second register set 309b while the software is writing the next descriptor to the first register set 308a. In each cycle, optionally, the software may also read the result of the task processed in the previous cycle while the hardware 306 is processing the current cycle's task.

Although in the above embodiments the register bank 304 comprises only a pair or register sets 309a, 309b and the method alternates between them, this is not limiting. In other variants the register bank 304 may comprise more than two (e.g. three or four) register sets 309, each for holding a respective descriptor. In this case the first selector 311 is arranged to connect the execution logic 302 to any selected one of the multiple register sets 309, and the second selector 312 is arranged to connect the hardware pipeline 306 to any selected one of the multiple register sets 309. This enables the software to set-up more than two task descriptors while the hardware pipeline 106 is performing its processing. The software may cycle through the multiple register sets, writing a respective task descriptor to each, and the kick manager 313 may also cycle through the registers, servicing the descriptors therein out of phase with the writing of the descriptors to those registers by the software.

In such embodiments, each of the multiple register sets may have its own respective kick flag register 308. A respective completion register 310 may also be associated with each set. I.e. the completion registers can be provided as N flags (e.g. N bits), where N is the number of register sets (e.g. two in FIGS. 3, 309*a* & 309*b*). So enough bits are provided to allow a bit to be set for each register set associated with the kick tracker. The kick manager 313 may keep track of the kick flags asserted by the software and services them in order. The software may keep track of which register ID is next to write to and sets the kick ID register 307 accordingly. The software may keep track of the order in which the completion flags are raised and perform the post-processing of the respective tasks' results in that order.

In the case of more than two register sets 309, the writing and processing do not necessarily have to be done in an alternating sequence, whereby the software writes just one next task descriptor per cycle while the pipeline 306 processes the current task (though that is certainly one possibility). In other embodiments, the software could for example write multiple descriptors during the first kick being processed by the pipeline 306. Alternatively or additionally, the hardware may complete a kick in respect of multiple register sets before the software (e.g. firmware) can process any of the associated interrupts.

Figures 5, 6:
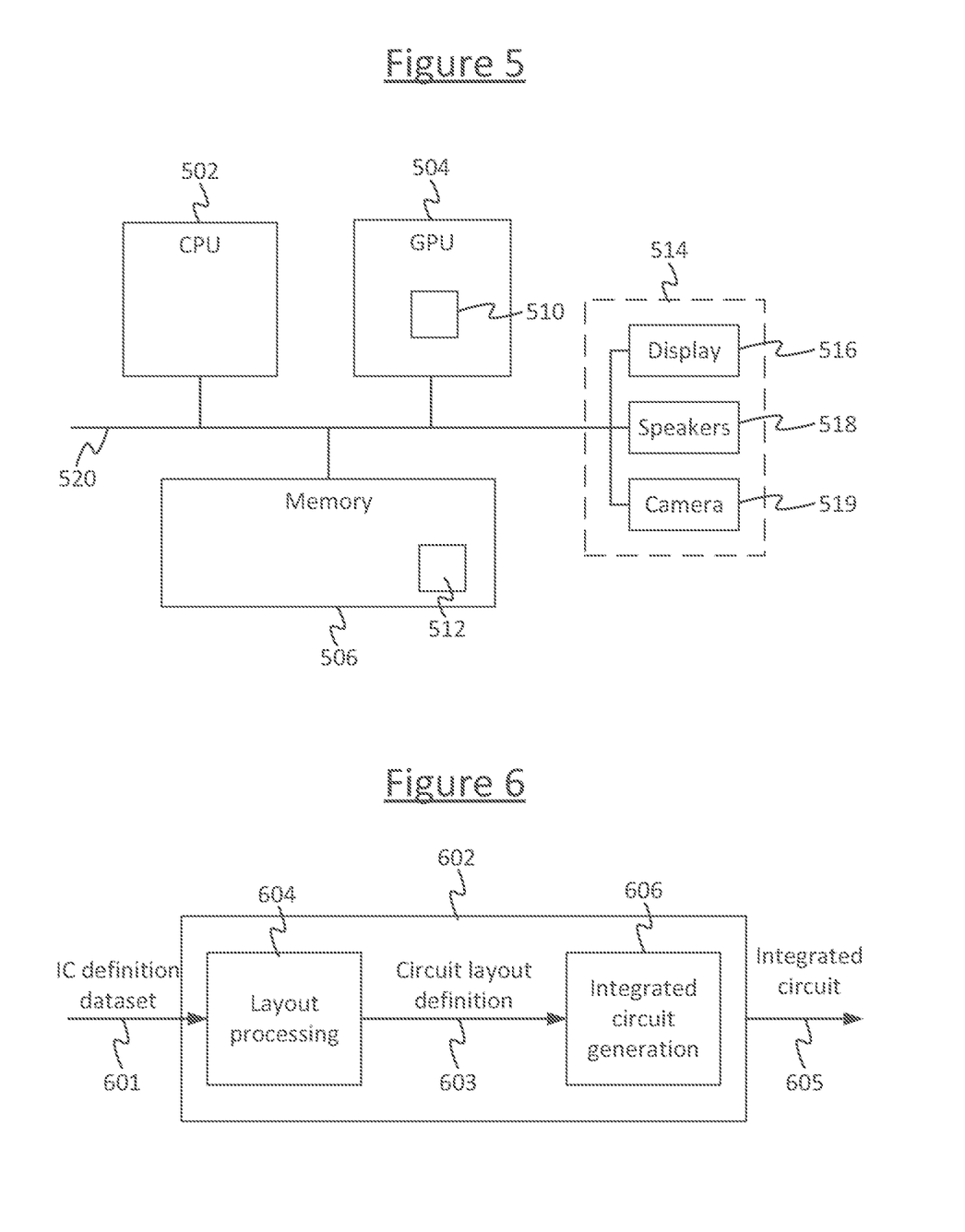
FIG. 5 is a schematic block diagram of a computer system in which a graphics processing system is implemented.
FIG. 6 is a schematic block diagram of an integrated circuit manufacturing system for generating an integrated circuit embodying a graphics processing system.

FIG. 5 shows a computer system in which the graphics processing systems described herein may be implemented. The computer system comprises a CPU 502, a GPU 504, a memory 506 and other devices 514, such as a display 516, speakers 518 and a camera 519. A processing block 510 (comprising the register bank 304, logic 305 and hardware pipeline 306 of FIG. 3) is implemented on the GPU 504. In other examples, the processing block 510 may be implemented on the CPU 502. The components of the computer system can communicate with each other via a communications bus 520. Software 512 is stored in the memory 506. This may comprise the software (e.g. firmware) run on the execution logic 302 as described in relation to FIG. 3.

The processor of FIG. 3 and system of FIG. 5 are shown as comprising a number of functional blocks. This is schematic only and is not intended to define a strict division between different logic elements of such entities. Each functional block may be provided in any suitable manner. It is to be understood that intermediate values described herein as being formed by a processor need not be physically generated by the processor at any point and may merely represent logical values which conveniently describe the processing performed by the processor between its input and output.

The processor described herein may be embodied in hardware on an integrated circuit. The processor described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processor configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, a processor as described herein. Furthermore, there may be provided an integrated circuit definition dataset that, when processed in an integrated circuit manufacturing system, causes the method of manufacturing a processor to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor will now be described with respect to FIG. 6.

FIG. 6 shows an example of an integrated circuit (IC) manufacturing system 602 which is configured to manufacture a processor as described in any of the examples herein. In particular, the IC manufacturing system 602 comprises a layout processing system 604 and an integrated circuit generation system 606. The IC manufacturing system 602 is configured to receive an IC definition dataset (e.g. defining a processor as described in any of the examples herein), process the IC definition dataset, and generate an IC according to the IC definition dataset (e.g. which embodies a processor as described in any of the examples herein). The processing of the IC definition dataset configures the IC manufacturing system 602 to manufacture an integrated circuit embodying a processor as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 1006. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

According to one aspect disclosed herein, there is provided a processor as set out in the Summary section.

In embodiments each task may be to process a different render or a different pass over a render.

There may be a hierarchy to the way a frame is processed—each frame may involve one or more renders, and each render may be composed of a single render or multiple sub-renders. So a pass over a frame is a render, and a pass over a render is a sub-render—although in both cases it is possible that there is only a single pass.

The render area may be a frame area or a subarea of the frame area of one or more frames. In embodiments at least some of the different tasks may comprise different renders over the frame area or the same subarea area, or overlapping parts of the frame area. E.g. the different renders may comprise renders of different ones of said frames, or different renders over a same one of said frames or the same subarea of the same frame, or the different passes may comprise different passes over the same frame or same subarea of the same frame. Alternatively the render area does not necessarily have to bear a direct relationship to the eventual frame. An example of this would be rendering a texture to a relatively small area that might only be a few hundred pixels square, to be mapped onto objects in the scene (e.g. which might be at an angle within the scene, and so the rendered texture doesn't appear 'as rendered' in the final scene, but skewed/transformed); whilst the screen or frame size may be much larger, e.g. 1920×780 pixels. In another example, it might be required to render a shadow map that is actually bigger than the screen size, which is then subsequently sampled from when producing the frame image for the screen.

Note also that while in some literature the fragment stage or pipeline is sometimes called the "rendering" stage or pipeline, or such like, more generally the term "render" or "rendering" does not limit to fragment processing and can refer to an overall graphical processing task the GPU performs on the data provided to it.

In embodiments, each of the completion registers may be an interrupt register and the respective completion flag may be an interrupt flag, so as when asserted to cause the execution logic to service the respective completed task as an interrupt.

In embodiments, the next register set is said other register set, and the next task is said other task.

In embodiments, the register bank may further comprise a set of global registers for specifying parameters common to tasks to performed based on descriptors in the register sets. For example the global registers may include an ID register, enabling the software to select which register set to write to by writing an ID of the selected register set to the ID register.

In embodiments the processor may take the form of a GPU. In some such embodiments the hardware pipeline may comprise a geometry pipeline or a fragment pipeline.

The processor may be sold in a form programmed with the software, or yet to be programmed.

According to further aspects disclosed herein, there may be provided a corresponding method of operating the processor, and a corresponding computer program configured to operate the processor.

According to one such aspect, there is provided a method whereby software writes descriptors to a register bank to specify tasks to be processed by a hardware pipeline, the register bank comprising a plurality of register sets including at least a first and a second register set, each register set being for holding one of the descriptors at any one time. The method comprises: software writing a descriptor specifying a first task to the first register set; control circuitry connecting the first register set to a hardware pipeline and triggering the hardware pipeline to process the first task based on the descriptor in the first register set; and while the hardware pipeline is connected to the first register set and processing the first task, the software writing a descriptor of a second task to the second register set.

In embodiments, in response to the hardware pipeline completing the processing of the first task, the control circuitry may connect the hardware pipeline to another of the register sets instead of the first and trigger the hardware pipeline to process another task based on the descriptor in said other register set.

In embodiments, once the hardware pipeline has completed processing the first task, the hardware pipeline may write one or more first results to memory and/or the first register set and assert a first completion flag, the one or more first results being a result of the processing of the first task. In response to the first completion flag being asserted and the software having completed writing said other task to said other register set, the software may read out and/or post-processes one, some or all of the one or more first results while the hardware pipeline is processing the other task.

In embodiments, said other task may be the second task and said other register set may be the second register set. Once the descriptor of the first task has been written to the first register set, the software may assert a ready flag in the first register set, and once the descriptor of the second task has been written to the second register set, the software may assert a ready flag in the second register set. The connecting of the hardware pipeline to the first register set may be performed in response to the first ready flag being asserted, and the connecting of the hardware pipeline to the second register set may be further conditional on the second ready flag being asserted. After the processing of the first task has been triggered, the control logic or hardware pipeline may de-assert the first ready flag.

After the software has begun reading out or post-processing the first result, the software may de-asserts the first completion flag. While the hardware pipeline is connected to the second register set and processing the second task, the processor may overwrite the descriptor of the first task with a new descriptor of a further first task, and once overwritten re-asserts the first ready flag. In response to the re-assertion of the first ready flag and the hardware pipeline having completed the processing of the second task, the control logic may re-connect the hardware pipeline back to the first register set instead of the second and triggers the hardware pipeline to process the further first task based on the new descriptor in the first register set.

In some use cases of any embodiment, the method may repeat cyclically, alternating back-and-forth between the first and second register sets.

According to yet further aspects there may be provided a corresponding method of manufacturing the processor, a corresponding manufacturing facility arranged to manufacture the processor, and a corresponding circuit design data set embodied on computer-readable storage.

For instance according to one aspect there may be provided a non-transitory computer readable storage medium having stored thereon a computer readable description of the processor of any embodiment herein which, when processed in an integrated circuit manufacturing system, causes the integrated circuit manufacturing system to: process, using a layout processing system, the computer readable description of the processor so as to generate a circuit layout description of an integrated circuit embodying said processor; and manufacture, using an integrated circuit generation system, the processor according to the circuit layout description.

According to another aspect, there may be provided an integrated circuit manufacturing system comprising: a non-transitory computer readable storage medium having stored thereon a computer readable description of the processor of any embodiment disclosed herein; a layout processing system configured to process the computer readable description so as to generate a circuit layout description of an integrated circuit embodying said processor; and an integrated circuit generation system configured to manufacture the processor according to the circuit layout description.

According to another aspect there may be provided a method of manufacturing, using an integrated circuit manufacturing system, a processor of any embodiment disclosed herein, the method comprising: processing, using a layout processing system, a computer readable description of said circuit so as to generate a circuit layout description of an integrated circuit embodying the processor; and manufacturing, using an integrated circuit generation system, the processor according to the circuit layout description.

According to another aspect there may be provided a layout processing system configured to determine positional information for logical components of a circuit derived from the integrated circuit description so as to generate a circuit layout description of an integrated circuit embodying the processor of any embodiment disclosed herein.

Other variants, implementations and/or applications of the disclosed techniques may become apparent to a person skilled in the art once given the disclosure herein. The scope of the present disclosure is not limited by the above-described embodiments but only by the claims.

What is claimed is:

1. A processor comprising:
execution logic comprising one or more execution units for running software;
a hardware pipeline comprising fixed-function hardware; and
a register bank to which the software can write descriptors specifying tasks to be processed by the hardware pipeline; wherein the register bank comprises a plurality of register sets, each for holding one of the descriptors of one of the tasks at any one time;
the processor comprises a first selector operable to connect the execution logic to a selected one of the register sets at any one time, and thereby enable the software to write successive ones of said descriptors to different ones of said register sets;
the processor comprises a second selector operable to connect the hardware pipeline to a selected one of the register sets at any one time; and
the processor further comprises control circuitry configured to control the hardware pipeline to begin processing a current one of said tasks based on the descriptor in a current register set of the register sets while the software is writing the descriptor of another of said tasks to another of the register sets, the current register set being that currently connected to the hardware pipeline by the second selector.

2. The processor of claim 1, wherein:
each of the register sets is arranged to further hold a respective ready flag, and the processor further comprises a respective completion register arranged to hold a respective completion flag associated with each of the register sets;
the hardware pipeline is configured to assert the respective completion flag once it has completed processing the task specified by the descriptor in the current register set; and
the control circuitry is configured to connect the hardware pipeline to a next one of the register sets, holding the descriptor of a next one of the tasks to be processed, once: a) the completion flag associated with the current register set has been asserted, and b) the respective ready flag of the next register set has been asserted by the software to indicate that the write of the next task's descriptor has been done.

3. The processor of claim 2, wherein:
the hardware pipeline is configured to write one or more results of the processing of the current task to memory and/or the current register set; and
the control circuitry is configured to control the hardware pipeline to begin processing the next task based on the descriptor in the next register set while the software is reading out and/or post-processing one, some or all of the results of the current task.

4. The processor of claim 3, wherein:
the control circuitry or hardware pipeline is configured to de-assert the respective ready flag once the processing of the task specified by the descriptor in the current register set has begun; and
the respective completion flag, when asserted, signals to the software to read out corresponding results that have been written back to the register set by the hardware pipeline, and to overwrite with a descriptor of a further task.

5. The processor of claim 4, wherein each of the completion registers is an interrupt register and the respective completion flag is an interrupt flag, so as when asserted to cause the execution logic to service the respective completed task as an interrupt.

6. The processor of claim 2, wherein the next register set is said another register set, and the next task is said another task.

7. The processor of claim 1, wherein the register bank further comprises a set of global registers for specifying parameters common to tasks to performed based on descriptors in the register sets.

8. The processor of claim 7, wherein the global registers include an ID register, enabling the software to select which register set to write to by writing an ID of the selected register set to the ID register.

9. The processor of claim 1, wherein the processor takes the form of a GPU.

10. The processor of claim 9, wherein the hardware pipeline comprises a geometry pipeline or a fragment pipeline.

11. The processor of claim 1, wherein the processor is programmed with the software.

12. A method of manufacturing a processor, comprising inputting a computer readable dataset description of a processor as claimed in claim 1, to an integrated circuit manufacturing system, causing the integrated circuit manufacturing system to manufacture an integrated circuit embodying the processor.

13. A non-transitory computer readable storage medium having stored thereon a computer readable description of a processor as claimed in claim 1 that, when processed in an integrated circuit manufacturing system, causes the integrated circuit manufacturing system to manufacture an integrated circuit embodying the processor.

14. An integrated circuit manufacturing system configured to manufacture a processor as claimed in claim 1.

15. A method comprising:
    running software on execution logic, the execution logic comprising one or more execution units;
    writing, by the software, descriptors to a register bank to specify tasks to be processed by a hardware pipeline, wherein the register bank comprises a plurality of register sets, each register set being for holding one of the descriptors of one of the tasks at any one time;
    connecting, by a first selector, the execution logic to a selected one of the register sets at any one time, and thereby enabling the software to write successive ones of said descriptors to different ones of said register sets;
    connecting, by a second selector, the hardware pipeline to a selected one of the register sets at any one time; and
    controlling, by control circuitry, the hardware pipeline to begin processing a current one of said tasks based on the descriptor in a current register set of the register sets while the software is writing the descriptor of another of said tasks to another of the register sets, the current register set being that currently connected to the hardware pipeline by the second selector.

16. The method of claim 15 wherein, in response to the hardware pipeline completing the processing of the first task, the control circuitry connects the hardware pipeline to another of the register sets instead of the first and triggers the hardware pipeline to process another task based on the descriptor in said another register set.

17. The method of claim 16, wherein:
    once the hardware pipeline has completed processing the first task, the hardware pipeline writes one or more first results to memory and/or the first register set and asserts a first completion flag, the one or more first results being a result of the processing of the first task; and
    in response to the first completion flag being asserted and the software having completed writing said other task to said another register set, the software reads out and/or post-processes one, some or all of the one or more first results while the hardware pipeline is processing the other task.

18. The method of claim 17, wherein:
    said other task is the second task and said another register set is the second register set;
    once the descriptor of the first task has been written to the first register set, the software asserts a ready flag in the first register set, and once the descriptor of the second task has been written to the second register set, the software asserts a ready flag in the second register set;
    the connecting of the hardware pipeline to the first register set is in response to the first ready flag being asserted, and the connecting of the hardware pipeline to the second register set is further conditional on the second ready flag being asserted; and
    after the processing of the first task has been triggered, the control logic or hardware pipeline de-asserts the first ready flag.

19. The method of claim 18, wherein:
    after the software has begun reading out or post-processing the first result, the software de-asserts the first completion flag;
    while the hardware pipeline is connected to the second register set and processing the second task, the processor overwrites the descriptor of the first task with a new descriptor of a further first task, and once overwritten re-asserts the first ready flag; and
    in response to the re-assertion of the first ready flag and the hardware pipeline having completed the processing of the second task, the control logic re-connects the hardware pipeline back to the first register set instead of the second and triggers the hardware pipeline to process the further first task based on the new descriptor in the first register set.

20. A non-transitory computer readable storage medium having stored thereon computer readable code, the computer readable code when executed by a processor performing a method of:
    running software on execution logic, the execution logic comprising one or more execution units;
    writing, by the software, descriptors to a register bank to specify tasks to be processed by a hardware pipeline, wherein the register bank comprises a plurality of register sets, each register set being for holding one of the descriptors of one of the tasks at any one time;
    connecting, by a first selector, the execution logic to a selected one of the register sets at any one time, and thereby enabling the software to write successive ones of said descriptors to different ones of said register sets;
    connecting, by a second selector, the hardware pipeline to a selected one of the register sets at any one time; and
    controlling, by control circuitry, the hardware pipeline to begin processing a current one of said tasks based on the descriptor in a current register set of the register sets while the software is writing the descriptor of another of said tasks to another of the register sets, the current register set being that currently connected to the hardware pipeline by the second selector.

\* \* \* \* \*